United States Patent
Zielinski et al.

(10) Patent No.: US 7,953,501 B2
(45) Date of Patent: May 31, 2011

(54) INDUSTRIAL PROCESS CONTROL LOOP MONITOR

(75) Inventors: Stephen A. Zielinski, Savage, MN (US); Thomas M. Bell, Lakeville, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 50 days.

(21) Appl. No.: 11/526,561

(22) Filed: Sep. 25, 2006

(65) Prior Publication Data
US 2008/0126861 A1 May 29, 2008

(51) Int. Cl.
*G05B 19/18* (2006.01)
*G05B 11/01* (2006.01)
*G05B 13/02* (2006.01)
*G05B 15/00* (2006.01)
*G01D 1/00* (2006.01)
*G06F 13/14* (2006.01)

(52) U.S. Cl. .................... 700/21; 700/3; 700/9; 700/18; 700/19; 700/20; 700/26; 700/27; 700/28; 700/83; 702/127; 710/305

(58) Field of Classification Search ................ 700/21, 700/3, 9, 20, 28, 83, 18, 19, 26, 27; 702/127; 710/305
See application file for complete search history.

(56) References Cited

U.S. PATENT DOCUMENTS

| | | | |
|---|---|---|---|
| 3,096,434 A | 7/1963 | King | |
| 3,404,264 A | 10/1968 | Kugler | |
| 3,468,164 A | 9/1969 | Sutherland | |
| 3,590,370 A | 6/1971 | Fleischer | |
| 3,618,592 A | 11/1971 | Stewart | |
| 3,688,190 A | 8/1972 | Blum | |
| 3,691,842 A | 9/1972 | Akeley | |
| 3,701,280 A | 10/1972 | Stroman | |
| 3,849,637 A | 11/1974 | Caruso et al. | 235/151 |
| 3,855,858 A | 12/1974 | Cushing | |
| 3,948,098 A | 4/1976 | Richardson et al. | 73/861.24 |
| 3,952,759 A | 4/1976 | Ottenstein | 137/12 |
| 3,973,184 A | 8/1976 | Raber | |
| RE29,383 E | 9/1977 | Gallatin et al. | |
| 4,058,975 A | 11/1977 | Gilbert et al. | |
| 4,074,354 A * | 2/1978 | Nakagawa et al. | 714/3 |
| 4,099,413 A | 7/1978 | Ohte et al. | |
| 4,102,199 A | 7/1978 | Talpouras | |
| 4,122,719 A | 10/1978 | Carlson et al. | |

(Continued)

FOREIGN PATENT DOCUMENTS

CA  999950  11/1976

(Continued)

OTHER PUBLICATIONS

International Search Report and Written Opinion from PCT/US2007/020182, dated May 26, 2008.

(Continued)

*Primary Examiner* — Ramesh B Patel
*Assistant Examiner* — Thomas Stevens
(74) *Attorney, Agent, or Firm* — Westman, Champlin & Kelly, P.A.

(57) ABSTRACT

A process control loop monitor includes a housing configured to mount in the field of an industrial process. A loop interface circuit couples to a process control loop and receives data from the process control loop. A memory stores data received by the loop interface circuit from the process control loop.

9 Claims, 4 Drawing Sheets

U.S. PATENT DOCUMENTS

| | | | |
|---|---|---|---|
| 4,249,164 A | 2/1981 | Tivy | 340/870.3 |
| 4,250,490 A | 2/1981 | Dahlke | |
| 4,279,013 A | 7/1981 | Dahlke | 340/870.37 |
| 4,337,516 A | 6/1982 | Murphy et al. | |
| 4,390,321 A | 6/1983 | Langlois et al. | |
| 4,399,824 A | 8/1983 | Davidson | |
| 4,417,312 A | 11/1983 | Cronin et al. | 364/510 |
| 4,459,858 A | 7/1984 | Marsh | 73/861.12 |
| 4,463,612 A | 8/1984 | Thompson | 73/861.22 |
| 4,517,468 A | 5/1985 | Kemper et al. | |
| 4,528,869 A | 7/1985 | Kubo et al. | |
| 4,530,234 A | 7/1985 | Cullick et al. | |
| 4,536,753 A | 8/1985 | Parker | |
| 4,540,468 A | 9/1985 | Genco et al. | 162/49 |
| 4,540,890 A | 9/1985 | Gangemi et al. | |
| 4,571,689 A | 2/1986 | Hildebrand et al. | |
| 4,630,265 A | 12/1986 | Sexton | |
| 4,635,214 A | 1/1987 | Kasai et al. | |
| 4,642,782 A | 2/1987 | Kemper et al. | |
| 4,644,479 A | 2/1987 | Kemper et al. | |
| 4,649,515 A | 3/1987 | Thompson et al. | |
| 4,668,473 A | 5/1987 | Agarwal | |
| 4,686,638 A | 8/1987 | Furuse | 364/558 |
| 4,707,796 A | 11/1987 | Calabro et al. | |
| 4,720,806 A | 1/1988 | Schippers et al. | |
| 4,736,367 A | 4/1988 | Wroblewski et al. | |
| 4,736,763 A | 4/1988 | Britton et al. | |
| 4,758,308 A | 7/1988 | Carr | 162/263 |
| 4,777,585 A | 10/1988 | Kokawa et al. | |
| 4,807,151 A | 2/1989 | Citron | |
| 4,818,994 A | 4/1989 | Orth et al. | |
| 4,831,564 A | 5/1989 | Suga | |
| 4,841,286 A | 6/1989 | Kummer | |
| 4,853,693 A | 8/1989 | Eaton-Williams | 340/588 |
| 4,873,655 A | 10/1989 | Kondraske | |
| 4,907,167 A | 3/1990 | Skeirik | |
| 4,924,418 A | 5/1990 | Backman et al. | |
| 4,926,364 A | 5/1990 | Brotherton | 364/581 |
| 4,934,196 A | 6/1990 | Romano | |
| 4,939,753 A | 7/1990 | Olson | |
| 4,964,125 A | 10/1990 | Kim | |
| 4,988,990 A | 1/1991 | Warrior | |
| 4,992,965 A | 2/1991 | Holter et al. | |
| 5,005,142 A | 4/1991 | Lipchak et al. | |
| 5,019,760 A | 5/1991 | Chu et al. | |
| 5,025,344 A | 6/1991 | Maly et al. | 361/88 |
| 5,043,862 A | 8/1991 | Takahashi et al. | |
| 5,053,815 A | 10/1991 | Wendell | |
| 5,057,774 A | 10/1991 | Verhelst et al. | 324/537 |
| 5,067,099 A | 11/1991 | McCown et al. | |
| 5,081,598 A | 1/1992 | Bellows et al. | |
| 5,089,979 A | 2/1992 | McEachern et al. | |
| 5,089,984 A | 2/1992 | Struger et al. | |
| 5,098,197 A | 3/1992 | Shepard et al. | |
| 5,099,436 A | 3/1992 | McCown et al. | |
| 5,103,409 A | 4/1992 | Shimizu et al. | |
| 5,111,531 A | 5/1992 | Grayson et al. | |
| 5,121,467 A | 6/1992 | Skeirik | |
| 5,122,794 A | 6/1992 | Warrior | |
| 5,122,948 A | 6/1992 | Zapolin | |
| 5,122,976 A | 6/1992 | Bellows et al. | |
| 5,130,936 A | 7/1992 | Sheppard et al. | |
| 5,134,574 A | 7/1992 | Beaverstock et al. | |
| 5,137,370 A | 8/1992 | McCullock et al. | |
| 5,142,612 A | 8/1992 | Skeirik | |
| 5,143,452 A | 9/1992 | Maxedon et al. | |
| 5,148,378 A | 9/1992 | Shibayama et al. | |
| 5,150,289 A | 9/1992 | Badavas | 364/154 |
| 5,167,009 A | 11/1992 | Skeirik | |
| 5,175,678 A | 12/1992 | Frerichs et al. | |
| 5,193,143 A | 3/1993 | Kaemmerer et al. | |
| 5,197,114 A | 3/1993 | Skeirik | |
| 5,197,328 A | 3/1993 | Fitzgerald | |
| 5,212,765 A | 5/1993 | Skeirik | |
| 5,214,582 A | 5/1993 | Gray | |
| 5,216,226 A | 6/1993 | Miyoshi | 219/497 |
| 5,224,203 A | 6/1993 | Skeirik | |
| 5,228,780 A | 7/1993 | Shepard et al. | |
| 5,235,527 A | 8/1993 | Ogawa et al. | |
| 5,265,031 A | 11/1993 | Malczewski | |
| 5,265,222 A | 11/1993 | Nishiya et al. | |
| 5,267,241 A | 11/1993 | Kowal | 714/706 |
| 5,269,311 A | 12/1993 | Kirchner et al. | |
| 5,274,572 A | 12/1993 | O'Neill et al. | |
| 5,282,131 A | 1/1994 | Rudd et al. | |
| 5,282,261 A | 1/1994 | Skeirik | |
| 5,293,585 A | 3/1994 | Morita | |
| 5,303,181 A | 4/1994 | Stockton | |
| 5,305,230 A | 4/1994 | Matsumoto et al. | |
| 5,311,421 A | 5/1994 | Nomura et al. | |
| 5,317,520 A | 5/1994 | Castle | |
| 5,327,357 A | 7/1994 | Feinstein et al. | |
| 5,333,240 A | 7/1994 | Matsumoto et al. | |
| 5,340,271 A | 8/1994 | Freeman et al. | 415/1 |
| 5,347,843 A | 9/1994 | Orr et al. | |
| 5,349,541 A | 9/1994 | Alexandro, Jr. et al. | |
| 5,357,449 A | 10/1994 | Oh | |
| 5,361,628 A | 11/1994 | Marko et al. | |
| 5,365,423 A | 11/1994 | Chand | |
| 5,365,787 A | 11/1994 | Hernandez et al. | |
| 5,367,612 A | 11/1994 | Bozich et al. | |
| 5,384,699 A | 1/1995 | Levy et al. | |
| 5,386,373 A | 1/1995 | Keeler et al. | |
| 5,388,465 A | 2/1995 | Okaniwa et al. | |
| 5,392,293 A | 2/1995 | Hsue | 324/765 |
| 5,394,341 A | 2/1995 | Kepner | |
| 5,394,543 A | 2/1995 | Hill et al. | |
| 5,404,064 A | 4/1995 | Mermelstein et al. | |
| 5,408,406 A | 4/1995 | Mathur et al. | |
| 5,408,586 A | 4/1995 | Skeirik | |
| 5,410,495 A | 4/1995 | Ramamurthi | 364/511.05 |
| 5,414,645 A | 5/1995 | Hirano | |
| 5,419,197 A | 5/1995 | Ogi et al. | |
| 5,430,642 A | 7/1995 | Nakajima et al. | |
| 5,434,774 A | 7/1995 | Seberger | 364/172 |
| 5,436,705 A | 7/1995 | Raj | |
| 5,440,478 A | 8/1995 | Fisher et al. | |
| 5,442,639 A | 8/1995 | Crowder et al. | |
| 5,467,355 A | 11/1995 | Umeda et al. | |
| 5,469,070 A | 11/1995 | Koluvek | |
| 5,469,156 A | 11/1995 | Kogura | |
| 5,469,735 A | 11/1995 | Watanabe | |
| 5,469,749 A | 11/1995 | Shimada et al. | 73/861.47 |
| 5,481,199 A | 1/1996 | Anderson et al. | |
| 5,481,200 A | 1/1996 | Voegele et al. | 324/718 |
| 5,481,481 A | 1/1996 | Frey et al. | |
| 5,483,387 A | 1/1996 | Bauhahn et al. | |
| 5,485,753 A | 1/1996 | Burns et al. | |
| 5,486,996 A | 1/1996 | Samad et al. | |
| 5,488,697 A | 1/1996 | Kaemmerer et al. | |
| 5,489,831 A | 2/1996 | Harris | |
| 5,495,769 A | 3/1996 | Broden et al. | |
| 5,510,779 A | 4/1996 | Maltby et al. | |
| 5,511,004 A | 4/1996 | Dubost et al. | |
| 5,526,293 A | 6/1996 | Mozumder et al. | |
| 5,539,638 A | 7/1996 | Keeler et al. | |
| 5,548,528 A | 8/1996 | Keeler et al. | |
| 5,549,137 A * | 8/1996 | Lenz et al. | 137/486 |
| 5,551,306 A | 9/1996 | Scarpa | |
| 5,555,190 A | 9/1996 | Derby et al. | |
| 5,558,115 A * | 9/1996 | Lenz et al. | 137/86 |
| 5,560,246 A | 10/1996 | Bottinger et al. | |
| 5,561,599 A | 10/1996 | Lu | |
| 5,570,034 A | 10/1996 | Needham et al. | 324/763 |
| 5,570,300 A | 10/1996 | Henry et al. | |
| 5,572,420 A | 11/1996 | Lu | |
| 5,572,438 A | 11/1996 | Ehlers et al. | 700/295 |
| 5,573,032 A | 11/1996 | Lenz et al. | |
| 5,578,763 A | 11/1996 | Spencer et al. | 73/861.08 |
| 5,591,922 A | 1/1997 | Segeral et al. | |
| 5,598,521 A | 1/1997 | Kilgore et al. | |
| 5,600,148 A | 2/1997 | Cole et al. | |
| 5,608,650 A | 3/1997 | McClendon et al. | |
| 5,623,605 A | 4/1997 | Keshav et al. | |
| 5,629,870 A | 5/1997 | Farag et al. | 364/551.01 |
| 5,631,825 A * | 5/1997 | van Weele et al. | 700/83 |
| 5,633,809 A | 5/1997 | Wissenbach et al. | |

| Patent No. | Date | Inventor | Class |
|---|---|---|---|
| 5,637,802 A | 6/1997 | Frick et al. | |
| 5,640,491 A | 6/1997 | Bhat et al. | |
| 5,644,240 A | 7/1997 | Brugger | 324/439 |
| 5,650,943 A | 7/1997 | Powell et al. | 702/51 |
| 5,654,869 A | 8/1997 | Ohi et al. | 361/540 |
| 5,661,668 A | 8/1997 | Yemini et al. | |
| 5,665,899 A | 9/1997 | Willcox | |
| 5,669,713 A | 9/1997 | Schwartz et al. | |
| 5,671,335 A | 9/1997 | Davis et al. | |
| 5,672,247 A | 9/1997 | Pangalos et al. | 162/65 |
| 5,675,504 A | 10/1997 | Serodes et al. | |
| 5,675,724 A | 10/1997 | Beal et al. | |
| 5,680,109 A | 10/1997 | Lowe et al. | |
| 5,682,317 A | 10/1997 | Keeler et al. | 364/431.03 |
| 5,700,090 A | 12/1997 | Eryurek | |
| 5,703,575 A | 12/1997 | Kirkpatrick | |
| 5,704,011 A | 12/1997 | Hansen et al. | |
| 5,705,754 A | 1/1998 | Keita et al. | 73/861.357 |
| 5,705,978 A | 1/1998 | Frick et al. | |
| 5,708,211 A | 1/1998 | Jepson et al. | |
| 5,708,585 A | 1/1998 | Kushion | |
| 5,710,370 A | 1/1998 | Shanahan et al. | |
| 5,710,708 A | 1/1998 | Wiegland | |
| 5,713,668 A | 2/1998 | Lunghofer et al. | |
| 5,719,378 A | 2/1998 | Jackson, Jr. et al. | |
| 5,731,522 A | 3/1998 | Sittler | |
| 5,736,649 A | 4/1998 | Kawasaki et al. | |
| 5,741,074 A | 4/1998 | Wang et al. | |
| 5,742,845 A | 4/1998 | Wagner | |
| 5,746,511 A | 5/1998 | Eryurek et al. | |
| 5,747,701 A | 5/1998 | Marsh et al. | |
| 5,752,008 A | 5/1998 | Bowling | 395/500 |
| 5,754,596 A | 5/1998 | Bischoff et al. | |
| 5,764,539 A | 6/1998 | Rani | 364/557 |
| 5,764,891 A | 6/1998 | Warrior | |
| 5,781,024 A | 7/1998 | Blomberg et al. | 324/763 |
| 5,781,878 A | 7/1998 | Mizoguchi et al. | |
| 5,790,413 A | 8/1998 | Bartusiak et al. | 364/485 |
| 5,801,689 A | 9/1998 | Huntsman | |
| 5,805,442 A | 9/1998 | Crater et al. | |
| 5,817,950 A | 10/1998 | Wiklund et al. | |
| 5,825,664 A | 10/1998 | Warrior et al. | 700/7 |
| 5,828,567 A | 10/1998 | Eryurek et al. | |
| 5,829,876 A | 11/1998 | Schwartz et al. | |
| 5,848,383 A | 12/1998 | Yuuns | |
| 5,850,523 A | 12/1998 | Gretta, Jr. | |
| 5,854,993 A | 12/1998 | Crichnik | 702/54 |
| 5,854,994 A | 12/1998 | Canada et al. | |
| 5,859,964 A | 1/1999 | Wang et al. | |
| 5,869,772 A | 2/1999 | Storer | 73/861.24 |
| 5,876,122 A | 3/1999 | Eryurek | |
| 5,880,376 A | 3/1999 | Sai et al. | |
| 5,887,978 A | 3/1999 | Lunghofer et al. | |
| 5,908,990 A | 6/1999 | Cummings | |
| 5,909,188 A * | 6/1999 | Tetzlaff et al. | 341/155 |
| 5,923,557 A | 7/1999 | Eidson | |
| 5,924,086 A | 7/1999 | Mathur et al. | |
| 5,926,778 A | 7/1999 | Pöppel | |
| 5,934,371 A | 8/1999 | Bussear et al. | |
| 5,936,514 A | 8/1999 | Anderson et al. | |
| 5,940,290 A | 8/1999 | Dixon | |
| 5,956,663 A | 9/1999 | Eryurek et al. | |
| 5,970,430 A * | 10/1999 | Burns et al. | 702/122 |
| 5,995,910 A | 11/1999 | Discenzo | |
| 6,002,952 A | 12/1999 | Diab et al. | 600/310 |
| 6,006,338 A | 12/1999 | Longsdorf et al. | |
| 6,014,612 A | 1/2000 | Larson et al. | 702/183 |
| 6,014,902 A | 1/2000 | Lewis et al. | |
| 6,016,523 A | 1/2000 | Zimmerman et al. | |
| 6,016,706 A | 1/2000 | Yamamoto et al. | |
| 6,017,143 A * | 1/2000 | Eryurek et al. | 700/51 |
| 6,023,399 A | 2/2000 | Kogure | 361/23 |
| 6,026,352 A | 2/2000 | Burns et al. | 702/182 |
| 6,035,878 A * | 3/2000 | Adams et al. | 137/1 |
| 6,038,579 A | 3/2000 | Sekine | |
| 6,045,260 A | 4/2000 | Schwartz et al. | |
| 6,046,642 A | 4/2000 | Brayton et al. | 330/296 |
| 6,047,220 A | 4/2000 | Eryurek et al. | |
| 6,047,222 A | 4/2000 | Burns et al. | |
| 6,052,655 A | 4/2000 | Kobayashi et al. | |
| 6,056,008 A * | 5/2000 | Adams et al. | 137/487.5 |
| 6,061,603 A | 5/2000 | Papadopoulos et al. | |
| 6,072,150 A | 6/2000 | Sheffer | 219/121.83 |
| 6,094,600 A | 7/2000 | Sharpe, Jr. et al. | 700/19 |
| 6,112,131 A | 8/2000 | Ghorashi et al. | 700/142 |
| 6,119,047 A * | 9/2000 | Eryurek et al. | 700/28 |
| 6,119,529 A | 9/2000 | Di Marco et al. | |
| 6,139,180 A | 10/2000 | Usher et al. | |
| 6,151,560 A | 11/2000 | Jones | |
| 6,179,964 B1 | 1/2001 | Begemann et al. | 162/198 |
| 6,182,501 B1 | 2/2001 | Furuse et al. | 73/49.2 |
| 6,192,281 B1 | 2/2001 | Brown et al. | |
| 6,195,591 B1 | 2/2001 | Nixon et al. | |
| 6,199,018 B1 | 3/2001 | Quist et al. | 702/34 |
| 6,209,048 B1 | 3/2001 | Wolff | |
| 6,236,948 B1 | 5/2001 | Eck et al. | |
| 6,237,424 B1 | 5/2001 | Salmasi et al. | 73/861.17 |
| 6,260,004 B1 | 7/2001 | Hays et al. | |
| 6,263,487 B1 | 7/2001 | Stripf et al. | |
| 6,272,438 B1 | 8/2001 | Cunningham et al. | |
| 6,289,735 B1 | 9/2001 | Dister et al. | 73/579 |
| 6,298,377 B1 | 10/2001 | Hartikainen et al. | |
| 6,298,454 B1 | 10/2001 | Schleiss et al. | 714/37 |
| 6,307,483 B1 | 10/2001 | Westfield et al. | |
| 6,311,136 B1 | 10/2001 | Henry et al. | |
| 6,317,701 B1 | 11/2001 | Pyotsia et al. | |
| 6,327,914 B1 | 12/2001 | Dutton | |
| 6,347,252 B1 | 2/2002 | Behr et al. | 700/2 |
| 6,356,191 B1 | 3/2002 | Kirkpatrick et al. | |
| 6,360,277 B1 | 3/2002 | Ruckley et al. | |
| 6,370,448 B1 | 4/2002 | Eryurek | 700/19 |
| 6,377,859 B1 | 4/2002 | Brown et al. | |
| 6,396,426 B1 | 5/2002 | Balard et al. | |
| 6,397,114 B1 | 5/2002 | Eryurek et al. | 700/32 |
| 6,405,099 B1 | 6/2002 | Nagai et al. | 700/159 |
| 6,425,038 B1 | 7/2002 | Sprecher | |
| 6,434,504 B1 | 8/2002 | Eryurek et al. | |
| 6,449,574 B1 | 9/2002 | Eryurek et al. | |
| 6,473,656 B1 | 10/2002 | Langels et al. | |
| 6,473,710 B1 | 10/2002 | Eryurek | |
| 6,480,793 B1 | 11/2002 | Martin | 702/45 |
| 6,487,462 B1 | 11/2002 | Reeves | |
| 6,492,921 B1 | 12/2002 | Kunitani et al. | |
| 6,493,689 B2 | 12/2002 | Kotoulas et al. | |
| 6,505,517 B1 | 1/2003 | Eryurek et al. | |
| 6,519,546 B1 | 2/2003 | Eryurek et al. | |
| 6,530,259 B1 | 3/2003 | Kelly et al. | 73/23.2 |
| 6,532,392 B1 | 3/2003 | Eryurek et al. | |
| 6,539,267 B1 * | 3/2003 | Eryurek et al. | 700/51 |
| 6,546,814 B1 | 4/2003 | Choe et al. | 73/862.08 |
| 6,556,145 B1 | 4/2003 | Kirkpatrick et al. | 340/870.17 |
| 6,564,268 B1 * | 5/2003 | Davis et al. | 710/11 |
| 6,594,603 B1 | 7/2003 | Eryurek et al. | |
| 6,601,005 B1 | 7/2003 | Eryurek et al. | |
| 6,611,724 B1 | 8/2003 | Buda et al. | |
| 6,611,775 B1 | 8/2003 | Coursolle et al. | |
| 6,615,149 B1 | 9/2003 | Wehrs | |
| 6,628,992 B2 * | 9/2003 | Osburn, III | 700/9 |
| 6,637,267 B2 | 10/2003 | Fiebelkorn et al. | 73/587 |
| 6,654,697 B1 * | 11/2003 | Eryurek et al. | 702/47 |
| 6,701,274 B1 | 3/2004 | Eryurek et al. | |
| 6,722,185 B2 | 4/2004 | Lawson et al. | 73/40 |
| 6,754,601 B1 | 6/2004 | Eryurek et al. | |
| 6,758,168 B2 | 7/2004 | Koskinen et al. | |
| 6,775,576 B2 * | 8/2004 | Spriggs et al. | 700/8 |
| 6,859,755 B2 | 2/2005 | Eryurek et al. | |
| 6,879,926 B2 * | 4/2005 | Schmit et al. | 702/123 |
| 6,904,476 B2 | 6/2005 | Hedtke | |
| 6,907,383 B2 | 6/2005 | Eryurek et al. | |
| 6,915,364 B1 | 7/2005 | Christensen et al. | |
| 6,970,003 B2 | 11/2005 | Rome et al. | |
| 6,976,503 B2 | 12/2005 | Ens et al. | 137/552 |
| 7,018,800 B2 | 3/2006 | Huisenga et al. | |
| 7,043,380 B2 * | 5/2006 | Rodenberg et al. | 702/62 |
| 7,058,542 B2 * | 6/2006 | Hauhia et al. | 702/183 |
| 7,085,610 B2 | 8/2006 | Eryurek et al. | |
| 7,099,852 B2 | 8/2006 | Unsworth et al. | |
| 7,109,883 B2 * | 9/2006 | Trimble et al. | 340/870.16 |

| | | | | | | |
|---|---|---|---|---|---|---|
| 7,114,516 | B2 | 10/2006 | It ............................... 137/487.5 | JP | 60-000507 | 1/1985 |
| 7,136,711 | B1 * | 11/2006 | Duncan et al. .................. 700/83 | JP | 60-76619 | 5/1985 |
| 7,171,281 | B2 * | 1/2007 | Weber et al. ..................... 700/96 | JP | 60-131495 | 7/1985 |
| 7,435,581 | B2 * | 10/2008 | West ........................... 435/289.1 | JP | 60-174915 | 9/1985 |
| 7,467,400 | B1 * | 12/2008 | Moss et al. .......................... 726/3 | JP | 62-30915 | 2/1987 |
| 7,599,762 | B2 * | 10/2009 | Discenzo et al. .................. 701/1 | JP | 62-080535 | 4/1987 |
| 7,651,034 | B2 * | 1/2010 | Weimer et al. .................. 236/11 | JP | 62-50901 | 9/1987 |
| 7,813,834 | B2 * | 10/2010 | Sudolcan et al. ............. 700/242 | JP | 63-169532 | 7/1988 |
| 2002/0013629 | A1 | 1/2002 | Nixon et al. | JP | 64-01914 | 1/1989 |
| 2002/0029808 | A1 | 3/2002 | Friend et al. .................. 137/551 | JP | 64-72699 | 3/1989 |
| 2002/0032544 | A1 | 3/2002 | Reid et al. ..................... 702/183 | JP | 11-87430 | 7/1989 |
| 2002/0077711 | A1 | 6/2002 | Nixon | JP | 2-05105 | 1/1990 |
| 2002/0121910 | A1 | 9/2002 | Rome et al. ................... 324/718 | JP | 3-229124 | 10/1991 |
| 2002/0145568 | A1 | 10/2002 | Winter .......................... 343/701 | JP | 4-70906 | 3/1992 |
| 2002/0148644 | A1 | 10/2002 | Schultz et al. .................. 175/39 | JP | 5-122768 | 5/1993 |
| 2002/0194547 | A1 | 12/2002 | Christensen et al. | JP | 6-95882 | 4/1994 |
| 2003/0033040 | A1 | 2/2003 | Billings ......................... 700/97 | JP | 06242192 | 9/1994 |
| 2003/0045962 | A1 | 3/2003 | Eryurek et al. | JP | 06-248224 | 10/1994 |
| 2003/0163475 | A1 * | 8/2003 | Frederick ...................... 707/100 | JP | 7-063586 | 3/1995 |
| 2004/0128034 | A1 | 7/2004 | Lenker et al. | JP | 07234988 | 9/1995 |
| 2004/0249583 | A1 | 12/2004 | Eryurek et al. | JP | 8-054923 | 2/1996 |
| 2005/0072239 | A1 | 4/2005 | Longsdorf et al. | JP | 8-102241 | 4/1996 |
| 2005/0168343 | A1 | 8/2005 | Longsdorf et al. ............. 340/664 | JP | 08-114638 | 5/1996 |
| 2005/0240359 | A1 * | 10/2005 | Frederick ....................... 702/45 | JP | 8-136386 | 5/1996 |
| 2005/0245291 | A1 * | 11/2005 | Brown et al. .................. 455/572 | JP | 8-166309 | 6/1996 |
| 2006/0048025 | A1 | 3/2006 | Filipovic | JP | 8-247076 | 9/1996 |
| 2006/0075009 | A1 | 4/2006 | Lenz et al. | JP | 8-313466 | 11/1996 |
| 2006/0261941 | A1 * | 11/2006 | Drake et al. ............. 340/539.26 | JP | 2712625 | 10/1997 |
| 2007/0010968 | A1 | 1/2007 | Longsdorf et al. | JP | 2712701 | 10/1997 |
| | | | | JP | 2753592 | 3/1998 |
| | | FOREIGN PATENT DOCUMENTS | | JP | 07225530 | 5/1998 |
| | | | | JP | 10-232170 | 9/1998 |
| DE | 32 13 866 | A1 | 10/1983 | JP | 11-083575 | 3/1999 |
| DE | 35 40 204 | C1 | 9/1986 | RU | 2190267 C2 | 9/2002 |
| DE | 40 08 560 | A1 | 9/1990 | WO | WO 94/25933 | 11/1994 |
| DE | 43 43 747 | | 6/1994 | WO | WO 95/23361 | 8/1995 |
| DE | 44 33 593 | A1 | 6/1995 | WO | WO 96/11389 | 4/1996 |
| DE | 195 02 499 | A1 | 8/1996 | WO | WO 96/12993 | 5/1996 |
| DE | 296 00 609 | U1 | 3/1997 | WO | WO 96/39617 | 12/1996 |
| DE | 197 04 694 | A1 | 8/1997 | WO | WO 97/21157 | 6/1997 |
| DE | 19930660 | A1 | 7/1999 | WO | WO 97/25603 | 7/1997 |
| DE | 199 05 071 | | 8/2000 | WO | WO 98/06024 | 2/1998 |
| DE | 19905071 | A1 | 8/2000 | WO | WO 98/13677 | 4/1998 |
| DE | 299 17 651 | U1 | 12/2000 | WO | WO 98/14855 | 4/1998 |
| DE | 199 47 129 | | 4/2001 | WO | WO 98/20469 | 5/1998 |
| DE | 100 36 971 | A1 | 2/2002 | WO | WO 98/39718 | 9/1998 |
| DE | 102 23 725 | A1 | 4/2003 | WO | WO 99/19782 | 4/1999 |
| EP | 0 122 622 | A1 | 10/1984 | WO | WO 00/41050 | 7/2000 |
| EP | 0 413 814 | A1 | 2/1991 | WO | WO 00/55700 | 9/2000 |
| EP | 0 487 419 | A2 | 5/1992 | WO | WO 00/70531 | 11/2000 |
| EP | 0 512 794 | A2 | 11/1992 | WO | WO 01/01213 A1 | 1/2001 |
| EP | 0 594 227 | A1 | 4/1994 | WO | WO 01/19440 | 3/2001 |
| EP | 0 624 847 | A1 | 11/1994 | WO | WO 01/77766 | 10/2001 |
| EP | 0 644 470 | A2 | 3/1995 | WO | WO 01/90704 A2 | 11/2001 |
| EP | 0 697 586 | A2 | 2/1996 | WO | WO 02/27418 | 4/2002 |
| EP | 0 749 057 | A1 | 12/1996 | WO | WO 02/071165 | 9/2002 |
| EP | 0 825 506 | A2 | 7/1997 | WO | WO 03/081002 | 10/2003 |
| EP | 0 827 096 | A2 | 9/1997 | WO | WO 2007/139843 | 12/2007 |
| EP | 0 838 768 | A2 | 9/1997 | | | |
| EP | 0 807 804 | A2 | 11/1997 | | | |
| EP | 1 058 093 | A1 | 5/1999 | | | |
| EP | 0 335 957 | B1 | 11/1999 | | | |
| EP | 1 022 626 | A2 | 7/2000 | | | |
| FR | 2 302 514 | | 9/1976 | | | |
| FR | 2 334 827 | | 7/1977 | | | |
| GB | 928704 | | 6/1963 | | | |
| GB | 1 534 280 | | 11/1978 | | | |
| GB | 1 534 288 | | 11/1978 | | | |
| GB | 2 310 346 | A | 8/1997 | | | |
| GB | 2 317 969 | | 4/1998 | | | |
| GB | 2 342 453 | A | 4/2000 | | | |
| GB | 2 347 232 | A | 8/2000 | | | |
| JP | 56-031573 | | 3/1981 | | | |
| JP | 57196619 | | 2/1982 | | | |
| JP | 58-129316 | | 8/1983 | | | |
| JP | 59-116811 | | 7/1984 | | | |
| JP | 59-163520 | | 9/1984 | | | |
| JP | 59-176643 | | 10/1984 | | | |
| JP | 59-211196 | | 11/1984 | | | |
| JP | 59-211896 | | 11/1984 | | | |

OTHER PUBLICATIONS

"Foundation Fieldbus Host Interfaces"; National Instruments; "NI AT-FBUS Series, NI PCI-FBUS/2, NI PCMCIA-FBUS Series"; prior to Jun. 2007, pp. 753-754.

"Data Capture, The Source of information", Gemba Solutions, The Stables, Wolvey Lodge Business Centre, Wolvey, Leicestershire, LE10 3HB; prior to Jun. 2007, 2 pages.

"Product Specification, Foundation™ Fieldbus, FBT-3"; Relcom Inc.; prior to Jun. 2007, p. 1 of 1.

"FB View, Fiedbus Network Analyzer"; SMAR International, Copyright 2001-2005; one page.

"SMV 3000 Smart Multivariable Transmitter: The Four-In-One Transmitter and Flow Computer", by Honeywell Inc.; Nov. 1995, 6 pages.

U.S. Appl. No. 09/257,896, filed Feb. 25, 1999, Eryurek at al.

"A TCP\IP Tutorial" by, Socolofsky et al., Spider Systems Limited, Jan. 1991 pp. 1-23.

"Approval Standards for Explosionproof Electrical Equipment General Requirements", Factory Mutual Research, Cl. No. 3615, Mar. 1989, pp. 1-34.

"Approval Standard Intrinsically Safe Apparatus and Associated Apparatus for Use in Class I, II and III Division 1 Hazardous (Classified) Locations", Factory Mutual Research, Cl. No. 3610, Oct. 1988, pp. 1-70, p. 1-75.

"Automation On-line" by, Phillips et al., Plant Services, Jul. 1997, pp. 41-45.

"Climb to New Heights by Controlling your PLCs Over the Internet" by, Phillips et al., Intech, Aug. 1998, pp. 50-51.

"CompProcessor for Piezoresistive Sensors" MCA Technologies Inc. (MCA7707), pp. 1-8.

"Ethernet emerges as viable, inexpensive fieldbus", Paul G. Schreier, Personal Engineering, Dec. 1997, p. 23-29.

"Ethernet Rules Closed-loop System" by, Eidson et al., Intech, Jun. 1998, pp. 39-42.

"Fieldbus Standard for Use in Industrial Control Systems Part 2: Physical Layer Specification and Service Definition", ISA-S50.02-1992, pp. 1-93.

"Fieldbus Standard for Use in Industrial Control Systems Part 3: Data Link Service Definition", ISA-S50.02-1997, Part 3, Aug. 1997, pp. 1-159.

Fieldbus Standard for Use in Industrial Control Systems Part 4: Data Link Protocol Specification, ISA-S50.02-1997, Part 4, Aug. 1997, pp. 1-148.

"Fieldbus Support for Process Analysis" by, Blevins et al., Fisher-Rosemount Systems, Inc., 1995, pp. 121-128.

"Fieldbus Technical Overview Understanding FOUNDATION™ fieldbus technology", Fisher-Rosemount, 1998, pp. 1-23.

"Hypertext Transfer Protocol—HTTP/1.0" by, Berners-Lee et al., MIT/LCS, May 1996, pp. 1-54.

"Infranets, Intranets, and the Internet" by, Pradip Madan, Echelon Corp, Sensors, Mar. 1997, pp. 46-50.

"Internet Protocol Darpa Internet Program Protocol Specification" by, Information Sciences Institute, University of Southern California, RFC 791, Sep. 1981, pp. 1-43.

"Introduction to Emit", emWare, Inc., 1997, pp. 1-22.

"Introduction to the Internet Protocols" by, Charles L. Hedrick, Computer Science Facilities Group, Rutgers University, Oct. 3, 1988, pp. 1-97.

"Is There a Future for Ethernet in Industrial Control?", Miclot et al., Plant Engineering, Oct. 1988, pp. 44-46, 48, 50.

LFM/SIMA Internet Remote Diagnostics Research Project Summary Report, Stanford University, Jan. 23, 1997, pp. 1-6.

"Managing Devices with the Web" by, Howard et al., Byte, Sep. 1997, pp. 45-64.

"Modular Microkernel Links GUI and Browser for Embedded Web Devices" by, Tom Williams, pp. 1-2.

"PC Software Gets Its Edge From Windows, Components, and the Internet", Wayne Labs, I&CS, Mar. 1997, pp. 23-32.

Proceedings Sensor Expo, Aneheim, California, Produced by Expocon Managemnet Associates, Inc., Apr. 1996, pp. 9-21.

Proceedings Sensor Expo, Boston, Massachuttes, Produced by Expocon Management Associates, Inc., May 1997, pp. 1-416.

"Smart Sensor Network of the Future" by, Jay Warrior, Sensors, Mar. 1997, pp. 40-45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1-69.

"On-Line Statistical Process Control for a Glass Tank Ingredient Scale," by R.A. Weisman, *IFAC real Time Programming*, 1985, pp. 29-38.

"The Performance of Control Charts for Monitoring Process Variation," by C. Lowry et al., *Commun. Statis.—Simula.*, 1995, pp. 409-437.

"A Knowledge-Based Approach for Detection and Diagnosis of Out-Of-Control Events in Manufacturing Processes," by P. Love et al., *IEEE*, 1989, pp. 736-741.

"Advanced Engine Diagnostics Using Universal Process Modeling", by P. O'Sullivan, *Presented at the 1996 SAE Conference on Future Transportation Technology*, pp. 1-9.

Parallel, Fault-Tolerant Control and Diagnostics System for Feedwater Regulation in PWRS, by E. Eryurek et al., *Proceedings of the American Power Conference*.

"Programmable Hardware Architectures for Sensor Validation", by M.P. Henry et al., *Control Eng. Practice*, vol. 4, No. 10., pp. 1339-1354, (1996).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040-1047.

"Signal Processing, Data Handling and Communications: The Case for Measurement Validation", by M.P. Henry, *Department of Engineering Science, Oxford University*.

"Smart Temperature Measurement in the '90s", by T. Kerlin et al., *C&I*, (1990), 3 pg.

"Software-Based Fault-Tolerant Control Design for Improved Power Plant Operation," *IEEE/IFAC Joint Symposium on Computer-Aided Control System Design*, Mar. 7-9, 1994 pp. 585-590.

A Standard Interface for Self-Validating Sensors, by M.P. Henry et al., *Report No. OUEL 1884/91*, (1991).

"Taking Full Advantage of Smart Transmitter Technology Now," by G. Orrison, *Control Engineering*, vol. 42, No. 1, Jan. 1995, 3 pg.

"Using Artificial Neural Networks to Identify Nuclear Power Plant States," by Israel E. Alguindigue et al., pp. 1-4.

"Application of Neural Computing Paradigms for Signal Validation," by B.R. Upadhyaya et al., *Department of Nuclear Engineering*, pp. 1-18.

"Application of Neural Networks for Sensor Validation and Plant Monitoring," by B. Upadhyaya et al., *Nuclear Technology*, vol. 97, No. 2, Feb. 1992 pp. 170-176.

"Automated Generation of Nonlinear System Characterization for Sensor Failure Detection," by B.R. Upadhyaya *ISA*, 1989 pp. 269-274.

"In Situ Calibration of Nuclear Plant Platinum Resistance Thermometers Using Johnson Noise Methods," *EPRI*, Jun. 1983, 136 pg.

"Johnson Noise Thermometer for High Radiation and High-Temperature Environments," by L. Oakses et al., *Fifth Symposium on Space Nuclear Power Systems*, Jan. 1988, pp. 2-23.

"Development of a Resistance Thermometer for Use Up to 1600° C.", by M.J. de Groot et al., *CAL Lab*, Jul./Aug. 1996, pp. 38-41.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249-1259.

"Field-based Architecture is Based on Open Systems, Improves Plant Performance", by P. Cleaveland, *I&CS*, Aug. 1996, pp. 73-74.

"Tuned-Circuit Dual-Mode Johnson Noise Thermometers," by R.L. Shepard et al., Apr. 1992. 6 pg.

"Tuned-Circuit Johnson Noise Thermometry," by Michael Roberts et al., *7th Symposium on Space Nuclear Power Systems*, Jan. 1990, 7 pg.

"Smart Field Devices Provide New Process Data, Increase System Flexibility," by Mark Boland, *I&CS*, Nov. 1994, pp. 45-51.

"Wavelet Analysis of Vibration, Part I: Theory[1]," by D.E. Newland, *Journal of Vibration and Acoustics*, vol. 116, Oct. 1994, pp. 409-416.

"Wavelet Analysis of Vibration, Part 2: Wavelet Maps," by D.E. Newland, *Journal of Vibrations and Acoustics*, vol. 116, Oct. 1994, pp. 417-425.

"Development of a Long-Life, High-Reliability Remotely Operated Johnson Noise Thermometer," by R.L. Shepard et al., *ISA*, 1991, pp. 77-84.

"Application of Johnson Noise Thermometry to Space Nuclear Reactors," by M.J. Roberts et al., *Presented on the 6th Symposium on Space Nuclear Power Systems*, Jan. 9-12, 1989.

"A Decade of Progress in High Temperature Johnson Noise Thermometry," by T.V. Blalock et al., *American Institute of Physics*, 1982 pp. 1219-1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1-50-6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310-1314.

"Detecting Blockage in Process Connections of Differential Pressure Transmitters", by E. Taya et al., *SICE*, 1995, pp. 1605-1608.

"Development and Application of Neural Network Algorithms for Process Diagnostics," by B.R. Upadhyaya et al., *Proceedings of the 29th Conference on Decision and Control*, 1990, pp. 3277-3282.

"A Fault-Tolerant Interface for Self-Validating Sensors", by M.P. Henry, *Colloquium*, pp. 3/1-3/2 (Nov. 1990).

"Fuzzy Logic and Artificial Neural Networks for Nuclear Power Plant Applications," by R.C. Berkan et al., *Proceedings of the American Power Conference*.

"Fuzzy Logic and Neural Network Applications to Fault Diagnosis", by P. Frank et al., *International Journal of Approximate Reasoning*, (1997), pp. 68-88.

"Keynote Paper: Hardware Compilation—A New Technique for Rapid Prototyping of Digital Systems—Applied to Sensor Validation", by M.P. Henry, *Control Eng. Practice*, vol. 3, No. 7., pp. 907-924, (1995).

"The Implications of Digital Communications on Sensor Validation", by M. Henry et al., *Report No. OUEL 1912/92*, (1992), 7 pg.

"In-Situ Response Time Testing of Thermocouples", *ISA*, by H.M. Hashemian et al., Paper No. 89-0056, pp. 587-593, (1989).

"An Integrated Architecture for Signal Validation in Power Plants," by B.R. Upadhyaya et al., *Third IEEE International Symposium on Intelligent Control*, Aug. 24-26, 1988, pp. 1-6.

"Integration of Multiple Signal Validation Modules for Sensor Monitoring," by B. Upadhyaya et al., *Department of Nuclear Engineering*, Jul. 8, 1990, pp. 1-6.

"Intelligent Behaviour for Self-Validating Sensors", by M.P. Henry, *Advances in Measurement*, pp. 1-7, (May 1990).

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284-L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244-246.

"Neural Networks for Sensor Validation and Plant Monitoring," by B. Upadhyaya, *International Fast Reactor Safety Meeting*, Aug. 12-16, 1990, pp. 2-10.

"Neural Networks for Sensor Validation and Plantwide Monitoring," by E. Eryurek, 1992, 4 pg.

"A New Method of Johnson Noise Thermometry", by C.J. Borkowski et al., *Rev. Sci. Instrum.*, vol. 45, No. 2, (Feb. 1974) pp. 151-162.

"Thermocouple Continuity Checker," IBM Technical Disclosure Bulletin, vol. 20, No. 5, pp. 1954 (Oct. 1977).

"A Self-Validating Thermocouple," Janice C-Y et al., IEEE Transactions on Control Systems Technology, vol. 5, No. 2, pp. 239-253 (Mar. 1997).

*Instrument Engineers' Handbook*, Chapter IV entitled "Temperature Measurements," by T.J. Claggett, pp. 266-333 (1982).

"emWare's Releases EMIT 3.0, Allowing Manufacturers to Internet and Network Enable Devices Royalty Free," 3 pages, PR Newswire (Nov. 4, 1998), 3 pg.

Warrior, J., "The IEEE P1451.1 Object Model Network Independent Interfaces for Sensors and Actuators," pp. 1-14, Rosemount Inc. (1997).

Warrior, J., "The Collision Between the Web and Plant Floor Automation," 6[Th]. WWW Conference Workshop on Embedded Web Technology, Santa Clara, CA (Apr. 7, 1997).

Microsoft Press Computer Dictionary, 3rd Edition, p. 124.

"Internal Statistical Quality Control for Quality Monitoring Instruments", by P. Girling et al., *ISA*, 15 pgs., 1999.

"Statistical Process Control (Practice Guide Series Book)", *Instrument Society of America*, 1995, pp. 1-58 and 169-204.

"Time-Frequency Analysis of Transient Pressure Signals for a Mechanical Heart Valve Cavitation Study," *ASAIO Journal*, by Alex A. Yu et al., vol. 44, No. 5, pp. M475-M479, (Sep.-Oct. 1998).

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., BED-vol. 28, pp. 297-298 (Nov. 6-11, 1994).

"Monitoring and Diagnosis of Cavitation in Pumps and Valves Using the Wigner Distribution," *Hydroacoustic Facilities, Instrumentation, and Experimental Techniques*, NCA-vol. 10, pp. 31-36 (1991).

"Developing Predictive Models for Cavitation Erosion," *Codes and Standards in a Global Environment*, PVP-vol. 259, pp. 189-192 (1993).

"Self-Diagnosing Intelligent Motors: A Key Enabler for Next Generation Manufacturing System," by Fred M. Discenzo et al., pp. Mar. 1-Mar. 4, 1999.

"A Microcomputer-Based Instrument for Applications in Platinum Resistance Thermomety," by H. Rosemary Taylor and Hector A. Navarro, Journal of Physics E. Scientific Instrument, vol. 16, No. 11, pp. 1100-1104 (1983).

"Experience in Using Estelle for the Specification and Verification of a Fieldbus Protocol: FIP," by Barretto et al., Computer Networking, pp. 295-304 (1990).

"Computer Simulation of H1 Field Bus Transmission," by Utsumi et al., Advances in Instrumentation and Control, vol. 46, Part 2, pp. 1815-1827 (1991).

"Progress in Fieldbus Developments for Measuring and Control Application," by A. Schwaier, Sensor and Acuators, pp. 115-119 (1991).

"Fault Diagnosis of Fieldbus Systems," by Jürgen Quade, pp. 577-581 (Oct. 1992).

"PROFIBUS Infrastructure Measures," by Tilo Pfeifer et al., pp. 416-419 (Aug. 1991).

"Simulation the Time Behaviour of Fieldbus Systems," by O. Schnelle, pp. 440-442 (1991).

"Field Bus Networks for Automation Systems Containing Intelligent Functional Unites," by W. Kriesel et al., pp. 486-489 (1987).

"Field Buses for Process Interconnection with Digital Control Systems," Tecnología, pp. 141-147 (1990).

"Decentralised Systems with Real-Time Field Bus," Netzwerke, Jg. Nr.3 v. 14.3, 4 pages (1990).

"Process Measurement and Analysis," by Liptak et al., Instrument Engineers' Handbook, Third Edition, pp. 528-530, (1995).

"Improving Dynamic Performance of Temperature Sensors With Fuzzy Control Techniques," by Wang Lei et al., pp. 872-873 (1992).

"Microsoft Press Computer Dictionary" 2nd Edition, 1994, Microsoft Press. p. 156.

International Search Report from Application No. PCT/US01/40791 with international filing date of May 22, 2001.

International Search Report from Application No. PCT/US01/40782 with international filing date of May 22, 2001.

International Search Report from Application No. PCT/02/14560 with international filing date of May 8, 2002.

International Search Report from Application No. PCT/US02/14934 with international filing date of May 8, 2002.

"On-Line Tool Condition Monitoring System With Wavelet Fuzzy Neural Network," by Li Xiaoli et al., pp. 271-276 (1997).

"Optimal Design of the Coils of an Electromagnetic Flow Meter," by Michalski, A. et al., IEEE Transactions on Magnetics, vol. 34, Issue 5, Part 1, pp. 2563-2566 (1998).

"Magnetic Fluid Flow Meter for Gases," Popa, N.C., IEEE Transactions on Magnetics, vol. 30, Issue 2, Part 1-2, pp. 936-938 (1993).

"New Approach to a Main Error Estimation for Primary Transducer of Electromagnetic Flow Meter," by Michalski, A., IEEE Instrumentation and Measurement Technology Conference Proceedings, vol. 2, pp. 1093-1097 (1998).

"Additional Information From Flowmeters Via Signal Analysis," by Amadi-Echendu, J.E. et al., IEEE Instrumentation and Measurement Technology Conference Record, vol. 7, pp. 187-193 (1990).

International Search Report from Application No. PCT/US02/06606 with international filing date of Mar. 5, 2002.

International Search Report from Application No. PCT/US02/30465 with international filing date of Sep. 25, 2002.

"What is a weighted moving average?", DAU Stat Refresher, http://cne.gmu.edu/modules/dau/stat/mvavgs/wma_bdy.html.

"Statistics Glossary: Time Series Data", by Easton et al., http://www.stats.gla.ac.uk/steps/glossary/time_series.html, Sep. 1997.

"The Indicators Story", Sustainable Seattle, pp. 55-59, 1998.

"Detecting Regimes in Temperature Time Series", by Clemins et al., *Artificial Neural Networks in Engineering, Proceedings*, pp. 727-732, 2001.

"Re: Digital Filter-Moving Average", The Math Forum, http://mathforum.org/discuss/sci.math/a/t/177212, Sep. 28, 2008.

U.S. Appl. No. 10/675,014, filed Sep. 2003, Longsdorf et al.

U.S. Appl. No. 10/744,809, filed Dec. 2003, Brown et al.

"Notification of Transmittal of the International Search Report and the Written Opinion of the International Searching Authority", or the Declaration for PCT/US2004/017300.

U.S. Appl. No. 10/893,144, filed Jul. 2004, Brown et al.

"Invitation to Pay Additional Fees" for PCT/US2004/031678.

"Notification of Transmittal of the International Search Report or the Declaration", PCT/US2004/025291.

"Notification of Transmittal of the International Search Report or the Declaration", PCT/US2004/031678.

"Notification of Transmittal of the International Search Report or the Declaration", PCT/US2005/011385.

"Notification of Transmittal of the International Preliminary Report on Patenatability", PCT/US2004/031678.

"Notification of Transmittal of International Search Report and the Written Opinion", PCT/US2004/022736.

"Notification of Transmittal of the International Search Report", PCT/US00/14798.

Official Communication from corresponding application EP0783839991239, dated Jul. 1, 2009.

"Notification of Transmittal of International Search Report and the Written Opinion", PCT/US2006/037535.

Office Action from related Chinese Patent Application No. 200780035384.9 dated prior to Jun. 28, 2010; 9 pages.

Office Action from related Russian Patent Application No. 2009115650 dated prior to Jul. 14, 2010; 8 pages.

Eryurek et al., "Advanced Diagnostics Achieved with Intelligent Sensors and Fieldbus", 2001, Measurement and Control vol. 34, p. 293-311.

\* cited by examiner

INDUSTRIAL PROCESS CONTROL LOOP MONITOR

BACKGROUND OF THE INVENTION

The present invention relates to process control systems of the type used to monitor and/or control operation of industrial processes. More specifically, the present invention relates to monitoring data on process control loops used in such systems.

Field devices (devices such as process controllers, monitors and transmitters) are used in the industrial process control industry to remotely control or sense a process variable. For example, a process variable such as temperature, pressure, etc., may be transmitted to a control room by a process variable transmitter. The sensed process variable can be used to control the process or can provide information about process operation to an operator. For example, information related to pressure of a process fluid may be transmitted to the control room and used to control the process, such as by controlling a valve in an oil refinery.

Communication with field devices can be through a number of techniques. One technique is through the use of a process control loop. Such process control loops have two wires which are used for carrying data. In some installations, the two wires are also used to power field devices. One process control loop signaling protocol is a 4-20 mA signal which is used to represent a process variable. Another signaling technique is the HART® communication protocol superimposes digital information on top of the 4-20 mA signal. Another technique is generally referred to as the Fieldbus communication protocol in which the analog current level on the loop is not used for transmitting information and all data is carried digitally.

As the complexity of communication protocols have increased, the complexity of the network configuration of field devices in industrial processes has also increased. In an installation with a complex network topology, it can be particularly difficult to diagnose and identify failures related to the communication network.

SUMMARY

A process control loop monitor includes a loop interface circuit configured to couple to a process control loop and receive data from the process control loop. A memory stores data received by the loop interface circuit from the process control loop. In one configuration, the loop monitor is implemented in a host which is also used to perform configuration of other devices on the process control loop.

DETAILED DESCRIPTION

As discussed in the Background section, process device network configurations can be complex and therefore problems can be difficult to diagnose. For example, the installation of Fieldbus instruments may require a complex network topology. This complexity can lead to networking problems as well as difficulties diagnosing such problems. This can result in additional service calls to diagnose the networking related problems. Such issues can be particularly troublesome when the industrial process is located in a remote area, or when the service personnel are inexperienced in diagnosing network related problems. The present invention provides a process control loop monitor configured to mount in the field of an industrial process and collect data from the two wire loop. The data is stored in a memory and is available for subsequent use by a technician to identify a fault in the process control loop network.

Figure 1:
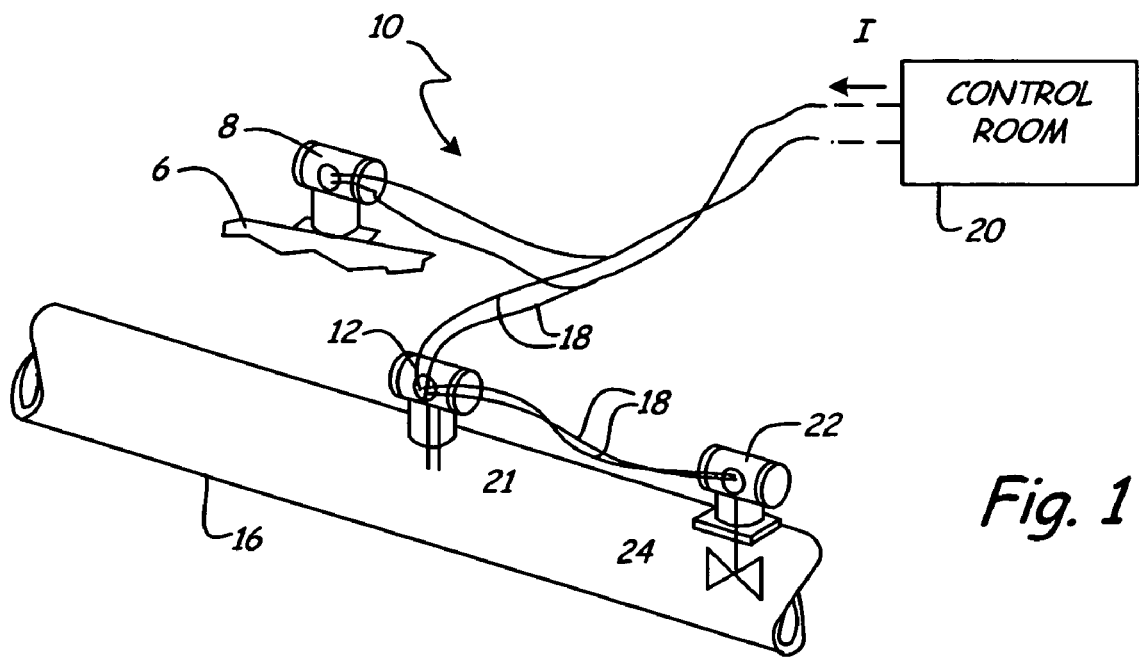
FIG. 1 is a simplified diagram of a process control system including a process control loop monitor.

FIG. 1 is a diagram of industrial process control or monitoring system 10 which includes process control loop monitor 8. Loop monitor 8 is mounted in the field of the industrial process to a support 6. The process control system 10 also includes a transmitter 12 and a valve positioner 22 coupled to process pipe 16. A sensor 21 is shown generically in FIG. 1 and couples to transmitter 12. FIG. 1 also shows valve positioner 22 coupled to a control element 24 which can comprise, for example, a valve.

One typical technique for transmitting information in an industrial process control and monitoring system involves controlling the amount of current flowing through a process control loop. Current is supplied from a current source in the control room and the process variable transmitter controls the current based upon a sensed process variable. For example, a 4 mA current signal can be used to indicate a zero reading and a 20 mA signal can be used to indicate a full scale reading. Similarly, a current level controlled in the control room can be used to control a valve positioner or the like. More recently, transmitters have employed digital circuitry which communicates with the control room using a digital signal which is superimposed on the analog current signal flowing through the process control loop. One example of such a technique is the HART® communication protocol.

Fieldbus is a communications protocol developed by the Fieldbus Foundation and is directed to defining a communications layer or protocol for transmitting information on a process control loop. In the Fieldbus protocol, the current flowing through the loop is not used to transmit an analog signal. Instead, all information is digitally transmitted. Further, the Fieldbus standard, and a standard known as Profibus, allow transmitters to be configured in a multi-drop configuration in which more than one transmitter is connected on the same process control loop. Other communication protocols include the MODBUS® protocol and Ethernet. In some configurations, two, three, four or any number of wires can be used to connect to the process device, including non-physical connections such as RF (radio frequency).

Process control loop monitor 8, transmitter 12 and positioner 22 are coupled to a process control loop 18 which operates in accordance with the Fieldbus, Profibus or HART® standard. However, the invention is not limited to these standards or a two-wire configuration. Process control loop 18 extends between a location in the field and the control room 20. In an embodiment in which loop 18 operates in accordance with the HART® protocol, loop 18 can carry a current I which is representative of a sensed process variable. Additionally, the HART® protocol allows a digital signal to be superimposed on the current through loop 18 such that digital information can be sent to or received from transmitter 12. When operating in accordance with the Fieldbus standard, loop 18 carries digital signals and can be coupled to multiple field devices such as other transmitters. Any number of process control loops 18 can be used and coupled to field mounted devices as appropriate. The configurations shown herein are for example purposes only.

As discussed above, FIG. 1 is a diagram showing an example of a process control system 10 which includes process piping 16 which carries a process fluid and process control loop 18 carrying loop current I. Transmitter 12, controller 22 (which couples to a final control element in the loop such as an actuator, valve, a pump, motor or solenoid), communicator 26 and control room 20 are all part of process control loop 18. It is understood that loop 18 is shown in one configuration and any appropriate process control loop may be used such as a 4-20 mA loop, 2, 3 or 4 wire loop, multidrop loop and a loop operating in accordance with the HART®, Fieldbus or other digital or analog communication protocol. Further, such a process control loop may employ various wireless technologies.

In operation, transmitter 12 senses a process variable such as flow using sensor 21 and transmits the sensed process variable over loop 18. The process variable may be received by controller/valve actuator 22 and/or control room equipment 20. Controller 22 is shown coupled to valve 24 and is capable of controlling the process by adjusting valve 24 thereby changing the flow in pipe 16. Controller 22 receives a control input over loop 18 from, for example, control room 20 or transmitter 12 and responsively adjusts valve 24. In another embodiment, controller 22 internally generates the control signal based upon process signals received over loop 18. Process devices include, for example, transmitter 12 (such as a 3051 S pressure transmitter available from Rosemount Inc.), controller 22, process control loop monitor 8 and control room 20 shown in FIG. 1. Another type of process device is a PC, programmable logic unit (PLC) or other computer coupled to the loop using appropriate I/O circuitry to allow monitoring, managing, and/or transmitting on the loop.

Figure 2:
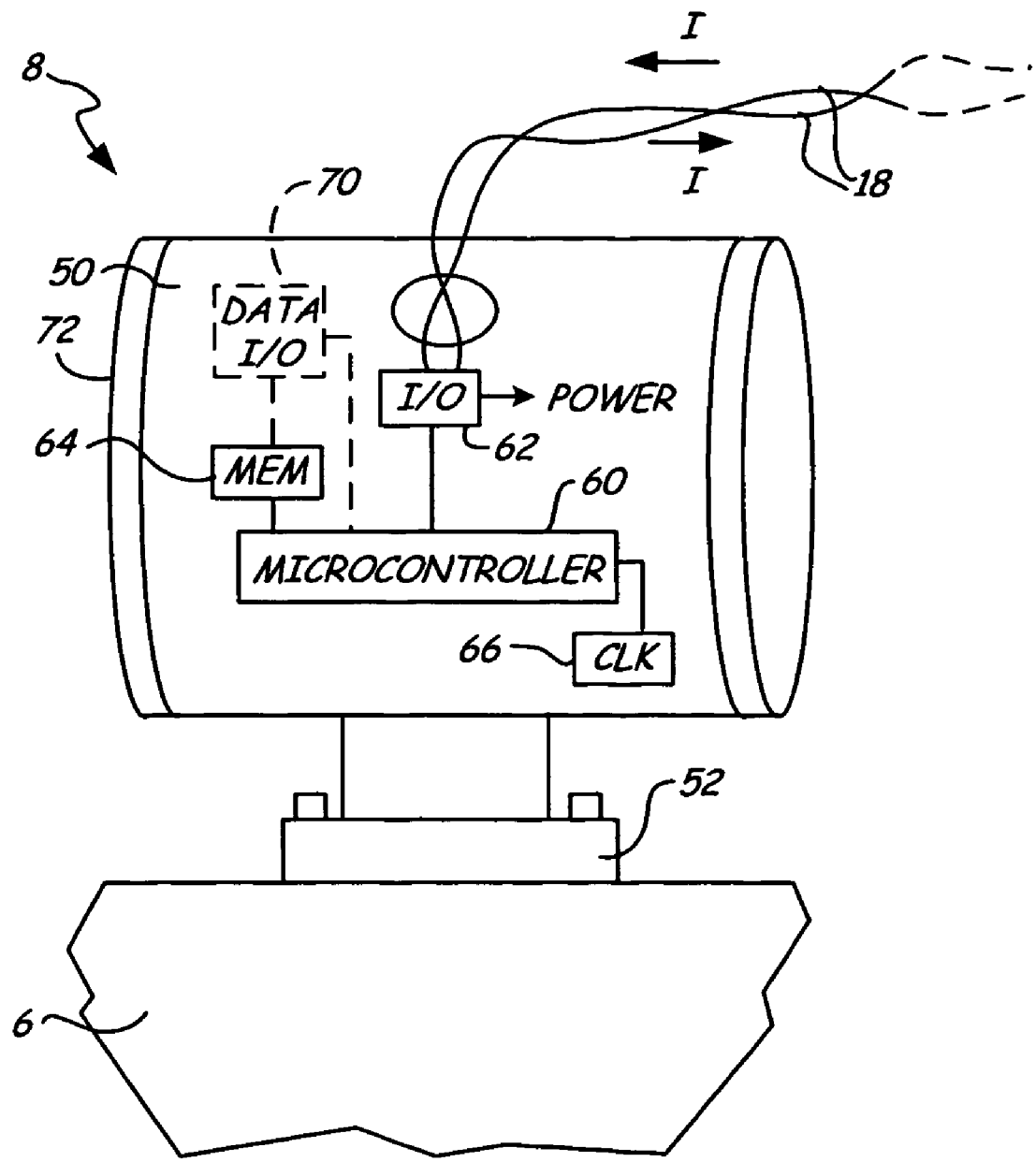
FIG. 2 is a block diagram of the process control loop monitor shown in FIG. 1.

FIG. 2 shows a simplified diagram of process control loop monitor 8. Loop monitor 8 includes a housing 50 configured to couple to support 6. In the configuration shown in FIG. 2, process control loop monitor 8 is designed to have a similar form factor as a typical process control transmitter. However, any appropriate design can be used. Additionally, the mount 52 used to couple process control loop monitor 8 to support 6 can be configured in accordance with standard designs such that it can be used with existing mounts of the type to mount process transmitters.

As illustrated in FIG. 2, process control loop monitor 8 includes a microcontroller 60, input/output circuitry 62 and memory 64. During operation, input/output circuitry 62 is coupled to process control loop 18 and monitors data traffic carried on loop 18. In some configurations, input/output circuitry 62 also includes a power output which provides power to the circuitry within monitor 8 which is generated from a current I carried on loop 18. In some configurations, input/output circuitry 62 comprises input only circuitry and is configured only to receive data input from process control loop 18. Microcontroller 60 can be a relatively simple circuit which is configured to store some or all of the data received from loop 18 in memory 64. The logging of data collected from loop 18 can be based upon a trigger, for example a particular type of data or event received from loop 18, triggered periodically or triggered at a certain time. For example, a clock 66 coupled to microcontroller 60 can be used to provide a microcontroller with time information. This time information can be used in some configurations to control the logging of data into memory 64. Additionally, if the logged data is time stamped with a real time clock, the data can subsequently be compared with other activities in the process control loop during that time to identify a problem in the loop 18.

Memory 64 can be any type of appropriate memory. Preferably, memory 64 is non-volatile memory such that the monitor 8 can be disconnected from a power source without losing the data stored in memory 64.

Figure 3:
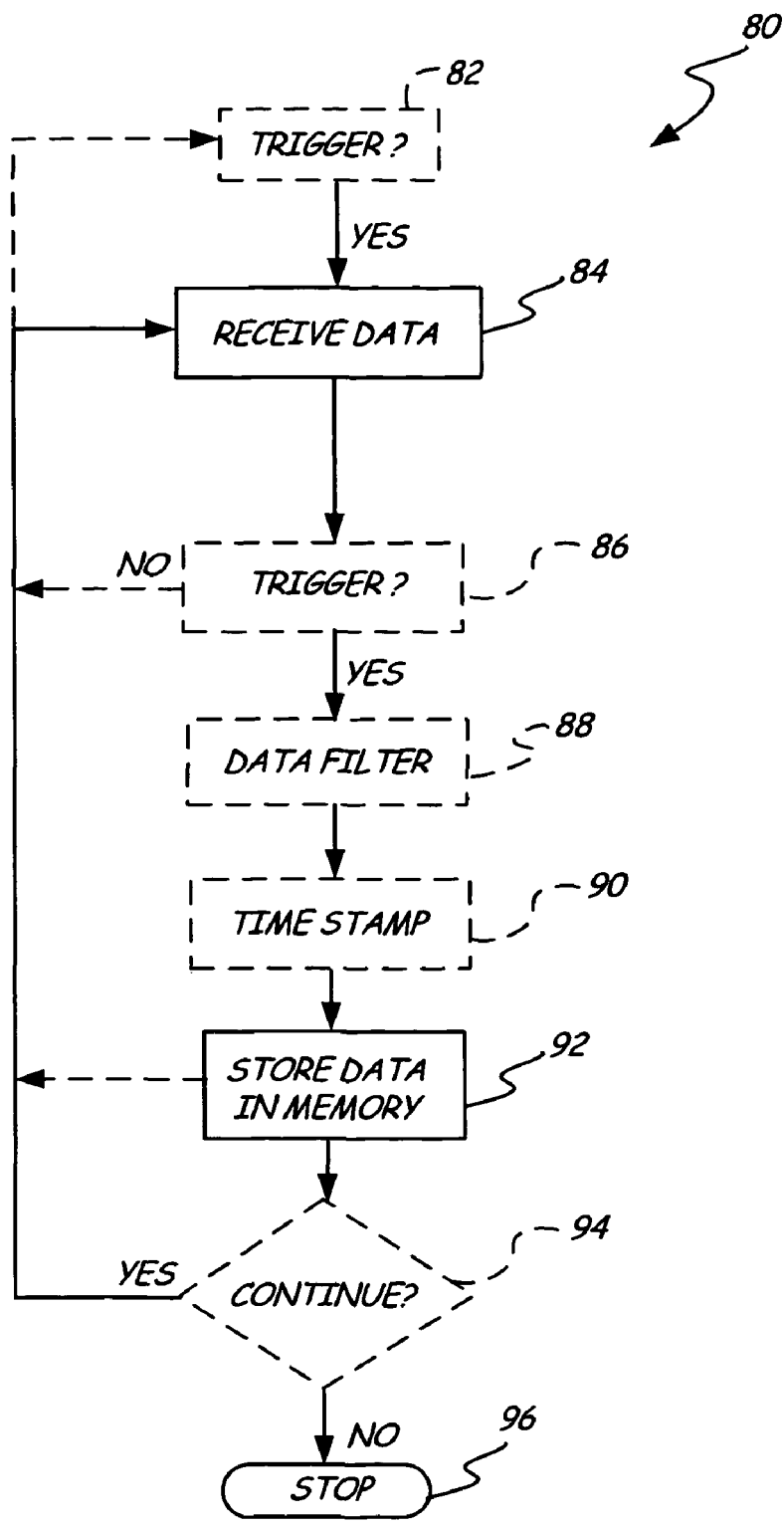
FIG. 3 is a simplified block diagram illustrating steps to log data in accordance with the present invention.

FIG. 3 is a block diagram 80 illustrating example operation of the process monitor 8 of the present invention. Initially, an optional trigger block 82 is provided. Optional trigger block 82 can be used to initiate data capture. For example, data capture can be initiated at a certain time, periodically or based upon some other event. At block 84, data is received over the process control loop 18. Another optional trigger block 86 can be utilized to determine if the collected data should be logged. For example, the received data can be inspected to determine if it is of the type desired for logging, such as from a particular process device or a particular data type. At optional block 86, if a trigger is not activated, control can be passed back to block 84 (or optional block 82). On the other hand, if the trigger is activated, control is passed to an optional data filter 86. Optional data filter 86 can be used to selectively filter what type of data will be logged. For example, extraneous data received from process control loop such as optional headers, etc. can be stripped from the data if desired to conserve space in memory 64. An optional time stamp can be provided at block 90. The time stamp can be generated from clock 66 shown in FIG. 2 and can be real time data or can be some type of a relative time. At block 92, the data is stored into the memory 64 and control is passed to an optional block 94. If optional block 94 does not exist, control can be returned to block 84 (or optional block 82). At optional block 94, a determination is made as to whether the data logging should continue. The determination can be based upon any appropriate criteria such as time, number of logged data points, amount of space left in memory 64, etc. If logging is to continue, control is passed back to block 84 (or optional block 82). On the other hand, if data logging is to stop, control is passed to block 96.

In some configurations, the logging of data can be controlled, for example, by sending commands to loop monitor 8 over process control loop 18. In one embodiment, aspects of the flow chart illustrated in FIG. 3 can be configured. For example, the triggers 82 and 86 may be configurable, the data filter 88, as well as the time stamp 90. The amount of data logged can be configurable, the frequency of logging (for example, logging of every $n^{th}$ message received over loop 18), whether the memory should be erased, etc. Another example of a configurable parameter is whether the memory is circular such that old entries are eventually overwritten with newer data.

Once the desired amount of data has been logged into memory 64, or after some other period, the data is collected by a service personnel for evaluation. The collection of data can be in accordance with any appropriate technique. The data can be downloaded over process control loop 18 or through an optional data input/output connection 70 shown in FIG. 2. For example, the data input/output connection 70 can be a plug in accordance with a known standard such as RS232, USB, etc. In another example, data input/output 70 can be used for accessing and programming microcontroller 60, for example, to control how the data is logged and the parameters associated with such logging. In another example, the data input/output uses a wireless communication technique such as through the use of radio frequency (RF), inductive coupling, sonic coupling, optical coupling, etc. The process monitor 8 can optionally be removed from the field and returned to a service location for evaluation. In another example, the memory 64 is carried in a removable module such that it can be removed from the process monitor 8. For example, an end cap 72 shown in FIG. 2 can be removed from housing 50 to allow access to memory 64. Memory can comprise a standardized removable module such as a compact flash, secured digital card, etc.

Figure 4:
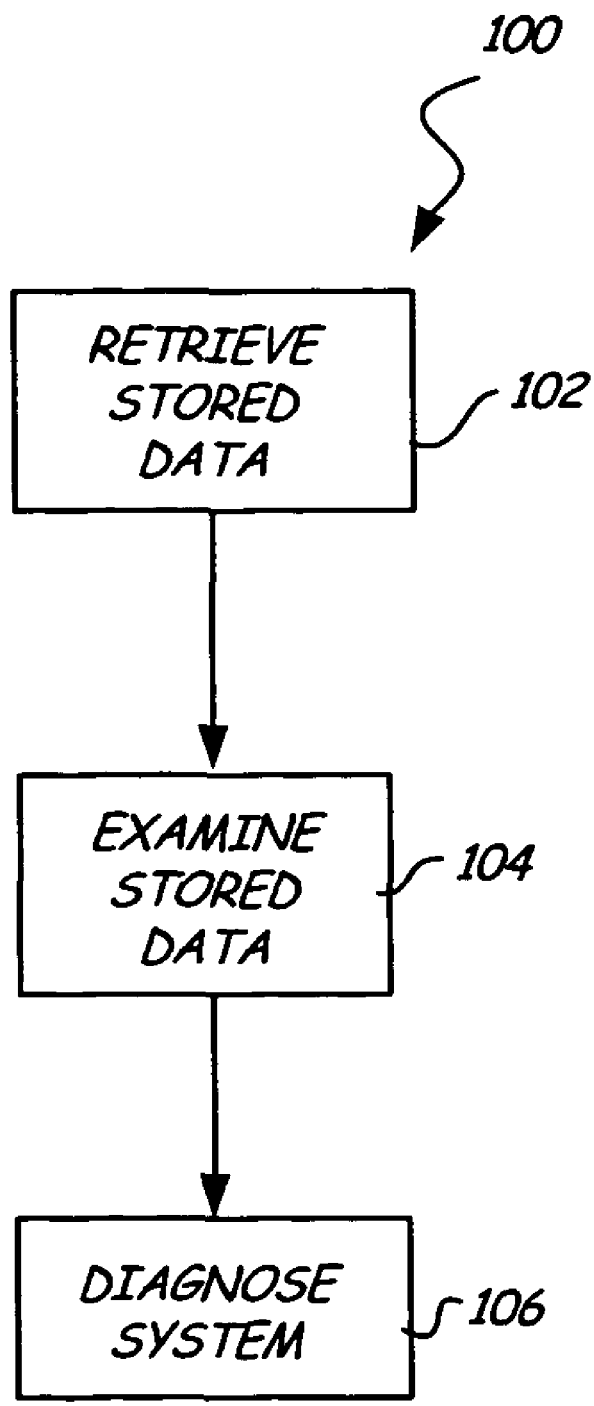
FIG. 4 is a simplified block diagram showing steps related to recovery of stored data.

FIG. 4 is a block diagram 100 showing steps associated with recovery of the stored data. At block 102, the data stored in memory 64 is retrieved through any appropriate technique. Next at block 104, the stored date is examined. For example, the data can be compared with other data, compared with known good data, etc. Based upon the examination, at block 106 the system is diagnosed, for example, to identify a network error or other problem in the process control loop.

Although the present invention has been described with reference to preferred embodiments, workers skilled in the art will recognize that changes may be made in form and detail without departing from the spirit and scope of the invention. In one specific example, the loop monitor does not contain any process interface element such as a sensor or control element. The loop monitor can be implemented in a host device of the type used to configure other devices on the process control loop. Host devices can be implemented in PCs, handheld devices, and in other devices. In such a configuration, device 8 comprises a host device, and I/O circuitry 62 (see FIG. 2) is used to send configuration commands to devices on loop 18.

What is claimed is:

1. A method of diagnosing operation of a process control loop used in a process control or monitor system of an industrial process, comprising:
   (a) coupling loop interface circuitry in a field mounted loop monitor to the process control loop at a field location of the industrial process.
   (b) receiving communication data in the field mounted loop monitor from the process control loop, from the communication data transmitted from a field device to a central control room on the industrial process control loop;
   (c) logging the received communication data in a memory in the field mounted loop monitor;
   (d) repeating steps (b) and (c);
   (e) retrieving the logged communication data from the field mounted loop monitor with an external device; and
   (f) diagnosing operations of the process control loop based upon the logged communication data with the external device whereby the logged communication data is logged within the field mounted loop monitor and subsequently provided to an external diagnostic device.

2. The method of claim 1 including diagnosing the process control loop based upon the retrieved logged communication data.

3. The method of claim 1 wherein the process control loop comprises a two wire process control loop.

4. The method of claim 1 wherein the process control loop carries communication data in accordance with a Fieldbus communication standard.

5. The method of claim 1 including removing the memory from the field mounted loop monitor.

6. The method of claim 1 including time stamping the logged communication data.

7. The method of claim 1 including mounting the field mounted loop monitor to a standardized coupling in process control and monitor systems.

8. The method of claim 1 including logging communication data in the memory in response to a trigger.

9. The method of claim 1 including filtering the communication data received from the process control loop prior to logging the communication data in the memory.

* * * * *